United States Patent
Dai (10) Patent No.: US 11,321,942 B2
(45) Date of Patent: May 3, 2022

(54) METHOD FOR MEASURING PLANT PLANTING DATA, DEVICE AND SYSTEM

(71) Applicant: GUANGZHOU XAIRCRAFT TECHNOLOGY CO., LTD., Guangdong (CN)

(72) Inventor: Shuangliang Dai, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/976,891

(22) PCT Filed: Feb. 19, 2019

(86) PCT No.: PCT/CN2019/075457
§ 371 (c)(1),
(2) Date: Aug. 31, 2020

(87) PCT Pub. No.: WO2019/179270
PCT Pub. Date: Sep. 26, 2019

(65) Prior Publication Data
US 2021/0004594 A1    Jan. 7, 2021

(30) Foreign Application Priority Data
Mar. 23, 2018 (CN) .......................... 201810247447.7

(51) Int. Cl.
*G06V 20/00* (2022.01)
*G06V 20/10* (2022.01)
(Continued)

(52) U.S. Cl.
CPC ........... *G06V 20/188* (2022.01); *B64D 43/00* (2013.01); *G01C 21/20* (2013.01); *G06K 9/6217* (2013.01);
(Continued)

(58) Field of Classification Search
CPC .... G06K 9/00657; G06K 9/46; G06K 9/6217; G06T 7/12; G06T 2207/20084;
(Continued)

(56) References Cited

U.S. PATENT DOCUMENTS

| 2013/0028487 A1 | 1/2013 | Stager et al. |
| 2013/0173321 A1* | 7/2013 | Johnson ................. G06Q 50/02 705/7.12 |

(Continued)

FOREIGN PATENT DOCUMENTS

| CN | 102749290 A | 10/2012 |
| CN | 103017753 A | 4/2013 |

(Continued)

OTHER PUBLICATIONS

Maryam Rahnemoonfar, Clay Sheppard: "Real-time yield estimation based on deep learning", Proceedings of SPIE; [Proceedings of SPIE ISSN 0277-786X vol. 10524], SPIE, US, vol. 10218, May 8, 2017 (May 8, 2017), pp. 1021809-1021809, XP060089337, DOI: 10.1117/12.2263097 ISBN: 978-1-5106-1533-5.

(Continued)

*Primary Examiner* — Michael R Neff
(74) *Attorney, Agent, or Firm* — Shumaker, Loop & Kendrick, LLP; James D. Miller (57) ABSTRACT

A method for measuring plant planting data, and a method for planning operating route, device and system are provided, which relate to the technical field of plant protection. The method includes: training a deep network model using historical information of a planting region (S210); receiving image information of the planting region (S220); processing the image information of the planting region using a deep network model to obtain plant planting data (S230); and outputting the plant planting data (S240). The method for planning operating route utilizes the plant planting data (Continued)

```
┌──────────────────────────────────────────────────────┐
│  Plant planting data of an operating region is       │──── S110
│  acquired from an operating region image for         │
│  operating route planning using a method for         │
│  measuring plant planting data                       │
└──────────────────────────────────────────────────────┘
                          │
                          ▼
┌──────────────────────────────────────────────────────┐
│  A selection operation is performed on the plant     │──── S120
│  planting data                                       │
└──────────────────────────────────────────────────────┘
                          │
                          ▼
┌──────────────────────────────────────────────────────┐
│  An operating route of a mobile device in the        │──── S130
│  operating region is planned according to the        │
│  plant planting data of the operating region         │
└──────────────────────────────────────────────────────┘
``` obtained by the measuring method to plan an operating route.

18 Claims, 5 Drawing Sheets

(51) Int. Cl.

| | | |
|---|---|---|
| *G06T 7/12* | (2017.01) | |
| *B64D 43/00* | (2006.01) | |
| *G01C 21/20* | (2006.01) | |
| *G06K 9/62* | (2022.01) | |
| *G06N 3/04* | (2006.01) | |
| *G06N 3/08* | (2006.01) | |
| *G06Q 10/04* | (2012.01) | |
| *G06Q 10/06* | (2012.01) | |
| *G06Q 50/02* | (2012.01) | |
| *G06V 10/40* | (2022.01) | |
| *B64C 39/02* | (2006.01) | |

(52) U.S. Cl.
CPC ............... *G06N 3/04* (2013.01); *G06N 3/08* (2013.01); *G06Q 10/047* (2013.01); *G06Q 10/06315* (2013.01); *G06Q 50/02* (2013.01); *G06T 7/12* (2017.01); *G06V 10/40* (2022.01); *B64C 39/024* (2013.01); *B64C 2201/027* (2013.01); *B64C 2201/12* (2013.01); *G06T 2207/20084* (2013.01); *G06T 2207/30188* (2013.01)

(58) Field of Classification Search
CPC .......... G06T 2207/30188; B64D 43/00; G01C 21/20; G06N 3/04; G06N 3/08; G06Q 10/047; G06Q 10/06315; G06Q 50/02; B64C 39/024; B64C 2201/027; B64C 2201/12

USPC ......................................................... 382/110
See application file for complete search history.

(56) References Cited

U.S. PATENT DOCUMENTS

| | | | |
|---|---|---|---|
| 2017/0032509 A1 | 2/2017 | Mannar et al. | |
| 2017/0161560 A1 | 6/2017 | Itzhaky et al. | |
| 2017/0206415 A1 | 7/2017 | Redden | |
| 2017/0219711 A1 | 8/2017 | Redden et al. | |
| 2017/0374323 A1* | 12/2017 | Gornik | H04N 7/185 |
| 2018/0211156 A1* | 7/2018 | Guan | G06Q 10/06 |
| 2019/0011921 A1* | 1/2019 | Wang | H04N 5/23299 |

FOREIGN PATENT DOCUMENTS

| | | |
|---|---|---|
| CN | 103336517 B | 6/2015 |
| CN | 105116911 A | 12/2015 |
| CN | 106846334 A | 6/2017 |
| CN | 106993167 A | 7/2017 |
| CN | 107315529 A | 11/2017 |
| CN | 107808375 A | 3/2018 |

OTHER PUBLICATIONS

Database WPI; Week 201802; Thomson Scientific, London, GB; AN 2017-85832J XP002804610, & CN 107 451 602 A (Univ Zhejiang Technology) Dec. 8, 2017 (Dec. 8, 2017).

Yu A. Gunchenko et al.; Using UAV for Unmanned Agricultural Harvesting Equipment Route Planning and Harvest Volume Measuring; 2017 IEEE 4th International Conference Actual Problems of Unmanned Aerial Vehicles Developments; pp. 262-265.

* cited by examiner

METHOD FOR MEASURING PLANT PLANTING DATA, DEVICE AND SYSTEM

CROSS-REFERENCE TO RELATED PATENT APPLICATIONS

The present disclosure is a United States national phase patent application under 35 U.S.C. § 371 of International Patent Application No. PCT/CN2019/075457 filed Feb. 19, 2019, entitled "Plant Planting Data Measuring Method, Working Route Planning Method, Device and System", which claims the benefit of Chinese Patent Application No. 201810247447.7 filed Mar. 23, 2018, the contents of both of which are hereby incorporated herein by reference in their entirety.

TECHNICAL FIELD

The disclosure relates to the technical field of plant protection, and more particularly, to a method for measuring plant planting data, and a method for planning operating route, device and system.

BACKGROUND

In the process of agricultural production, the output of agricultural products has attracted people's attention for a long time, which directly determines the income of agricultural managers. Therefore, agricultural managers often estimate the economic benefits of agricultural products by calculating the output of agricultural products.

At present, the factors that affect the output of agricultural products mainly include plant planting data such as planting quantity and plant size. The plant planting data are very important for agricultural managers to predict the economic benefits of agricultural products. They are often obtained by manual statistics, which makes the statistical efficiency of plant planting data relatively low. Especially for some crops with a large planting area, the statistics of plant planting data will become very complicated.

SUMMARY

In a first aspect, the embodiments of the disclosure provide a method for measuring plant planting data, which may include the following steps: Image information of a planting region is received; the image information of the planting region is processed using a preset recognition model to obtain plant planting data.

In a second aspect, the embodiments of the disclosure also provide a device for measuring plant planting data, which may include:
 a receiving component, configured to receive image information of a planting region; and
 a processing component, configured to process the image information of the planting region using a preset recognition model to obtain plant planting data.

In a third aspect, the embodiments of the disclosure also provide a plant planting data measuring system, which may include a mapping device and the device for measuring plant planting data in the above technical solution. An output end of the mapping device may be connected to a receiving component of the device for measuring plant planting data.

In a fourth aspect, the embodiments of the disclosure also provide a method for planning operating route, which may include the following steps.

Plant planting data of an operating region is acquired from an operating region image for operating route planning according to the method for measuring plant planting data in the above technical solution.

An operating route of a mobile device in the operating region is planned according to the plant planting data of the operating region.

In a fifth aspect, the embodiments of the disclosure also provide an operating route planning system, which may include:
 the device for measuring plant planting data in the above technical solution, configured to acquire, according to a method for measuring plant planting data provided in the above technical solution, plant planting data of an operating region from an operating region image for operating route planning; and
 a planning component, configured to plan an operating route of a mobile device in the operating region according to the plant planting data of the operating region.

BRIEF DESCRIPTION OF THE DRAWINGS

The accompanying drawings described herein are used to provide a further understanding of the disclosure, and constitute a part of the disclosure, and the exemplary embodiments of the disclosure and the description thereof are used to explain the disclosure, but do not constitute improper limitations to the disclosure. In the drawings.

DETAILED DESCRIPTION OF THE EMBODIMENTS

The technical solutions in the embodiments of the disclosure will be clearly and completely described below with reference to the drawings in the embodiments of the disclosure. It is apparent that the described embodiments are only a part of the embodiments of the disclosure, not all of the embodiments. All other embodiments obtained by those of ordinary skill in the art based on the embodiments of the disclosure without creative efforts should fall within the scope of protection of the disclosure.

In view of the manual statistics of plant planting data, the statistical efficiency of plant planting data is low. Especially for some crops with a large planting area, the statistics of plant planting data will become very complicated. The embodiments of the disclosure provide a method for measuring plant planting data, and a method for planning operating route, device and system to solve the problem, which may be used for the measurement of crop planting data with image recognition. It is convenient and quick to obtain plant planting data without the influence of the planting area. Moreover, the plant planting data measured in the embodiments of the disclosure may be used not only to predict plant yield, but also to observe the growth condition of the plant. The plant planting data is used to plan an operating route in a case that the plant needs to be operated.

Embodiment 1

The embodiment of the disclosure provides a method for planning operating route. The method for planning operating route includes the following steps.

In step S110, plant planting data of an operating region is acquired from an operating region image for operating route planning using a method for measuring plant planting data.

In step S130, an operating route of a mobile device in the operating region is planned according to the plant planting data of the operating region.

The method for measuring plant planting data is to measure plant planting data based on an image recognition technology such as training and learning. The image recognition technology may be a deep network learning technology or other image recognition technologies. For example, simple color recognition, shape recognition, image segmentation, edge recognition may be used to separate the required plant planting data from an operating region image. The image recognition technologies may be used to quickly separate the required plant planting data of the operating region from the operating region image, and plan an operating route of a mobile device in the operating region according to the plant planting data of the operating region, thereby improving the accuracy of operating execution, avoiding the phenomenon of blind operation, and improving the mapping efficiency.

The mobile device includes unmanned aerial vehicles, aircrafts, tractors, cultivators, harvesters, and intelligent robots. The unmanned aerial vehicles may be used to spray pesticides, fertilizers, and seeds in regions to be operated. The tractors, the cultivators and the harvesters may be used to cultivate and harvest farmlands. The intelligent robots may perform automatic picking, cotton sharpening, laser weeding and insect removal in regions to be operated.

It is to be noted that the operating route planned in the embodiment of the disclosure may include one or more of an arc-shaped route, a spiral route, a concentric circle route, a broken-line route, and an in-situ rotation route. In one embodiment of the disclosure, the arc-shaped route is to first determine a plurality of parallel operating routes of an operation in a region to be operated, and connect the operating routes end to end into a continuous operating route. The spiral route is an operating route spiral outward like a sea snail, which rotates outward gradually from an operating center point. The concentric circle route includes a plurality of concentric circle routes centered on the operating center. The broken-line route is a broken-line route formed by connecting necessary operating points in sequence. In one embodiment of the disclosure, the broken-line route is flexibly set to a free route. In one embodiment of the disclosure, the in-situ rotation route is used to characterize the in-situ rotation of an operating machine. For example, in a case that an unmanned aerial vehicle sprays chemical liquid on a fruit tree, it may be uniformly sprayed by in-situ rotation.

Figure 1:
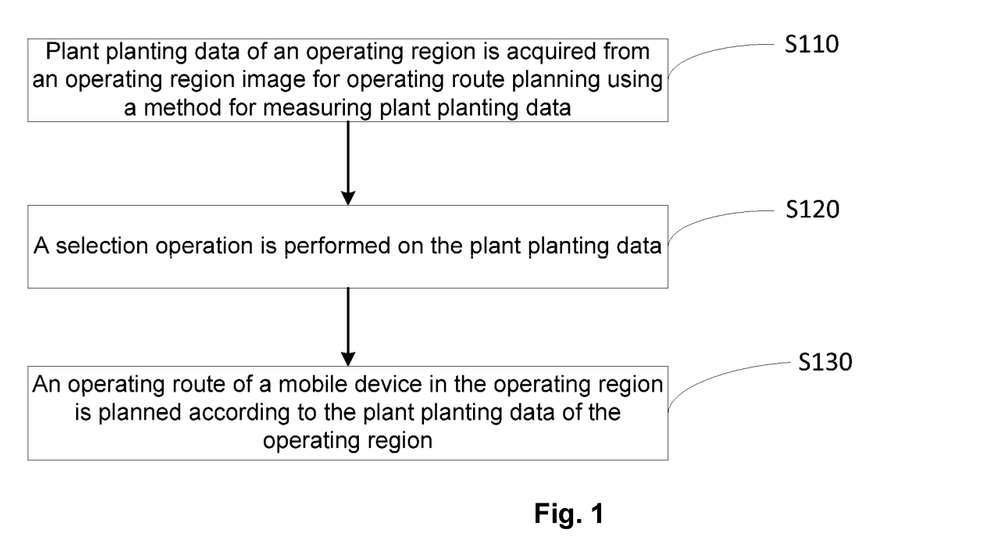
FIG. 1 is a flowchart of a method for planning operating route provided by an embodiment of the disclosure.
Figure 2:
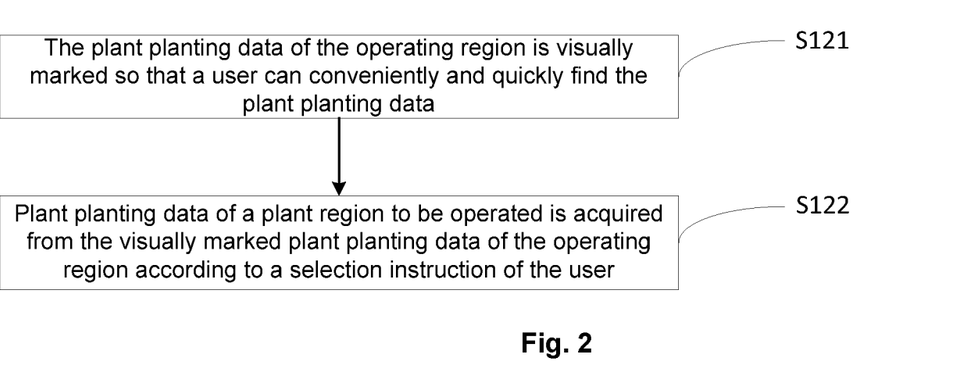
FIG. 2 is a flowchart of a selection operation for plant planting data in an embodiment of the disclosure.

In order to humanize the operating planning method provided by the embodiment of the disclosure, after acquiring plant planting data of an operating region and before planning an operating route of a mobile device in the operating region, the method for planning operating route provided by the embodiment of the disclosure further includes the following step: In step S120 shown in FIG. 1, a selection operation is performed on the plant planting data. As shown in FIG. 2, the step specifically includes the following steps:

In step S121, the plant planting data of the operating region is visually marked so that a user can conveniently and quickly find the plant planting data.

In step S122, plant planting data of a plant region to be operated is acquired from the visually marked plant planting data of the operating region according to a selection instruction of the user.

During embodiments of disclosure, the visually marked plant planting data of the operating region may be displayed on a mobile phone, a tablet, and other terminal devices. The user sees the visually marked plant planting data of the operating region on the terminal device, and outputs a selection instruction according to actual needs. The terminal device acquires the plant planting data of a plant region to be operated from the visually marked plant planting data of the operating region according to the selection instruction of the user. That is to say, the function of a selection operation in the embodiment of the disclosure may be integrated on the terminal device, and may also be integrated on a processor with the functions of a line planning method.

The operation that an operating route of a mobile device in the operating region is planned according to the plant planting data of the operating region includes the following step.

An operating route of the mobile device in the plant region to be operated is planned according to the plant planting data of the plant region to be operated.

Figure 3:
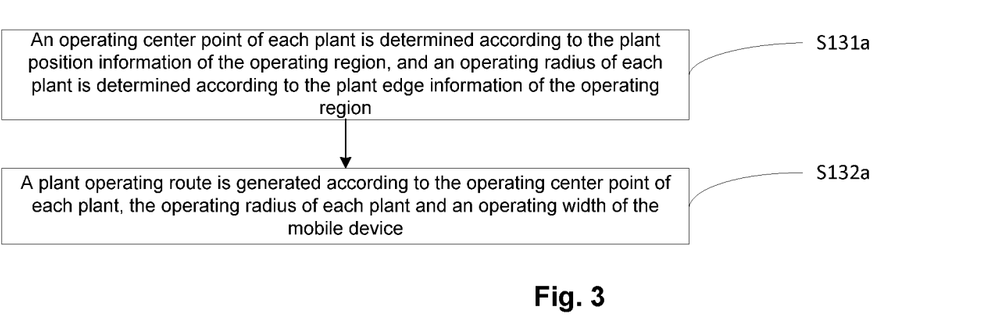
FIG. 3 is a flowchart 1 of planning an operating route of a mobile device in an operating region in an embodiment of the disclosure.

Exemplarily, if the terrain of the operating region is relatively flat and the region is relatively large in plant radius, the operating route of a single plant may be planned. For example, in a case that the plant planting data includes plant edge information and plant position information, as shown in FIG. 3, the operation that an operating route of a mobile device in the operating region is planned according to the plant planting data of the operating region includes the following steps:

In step S131a, an operating center point of each plant is determined according to the plant position information of the operating region, and an operating radius of each plant is determined according to the plant edge information of the operating region. The operating center point of each plant is substantially the geometric center of the plant.

In step S132a, a plant operating route is generated according to the operating center point of each plant, the operating radius of each plant and an operating width of the mobile device. The plant operating route is used to control the operating route of the mobile device in the operating region.

Specifically, an operating path of each plant is generated according to the operating radius and the operating center point of each plant, and the operating width of the mobile device. In other words, the generated plant operating route is substantially combined from the operating path of each plant.

Figure 4:
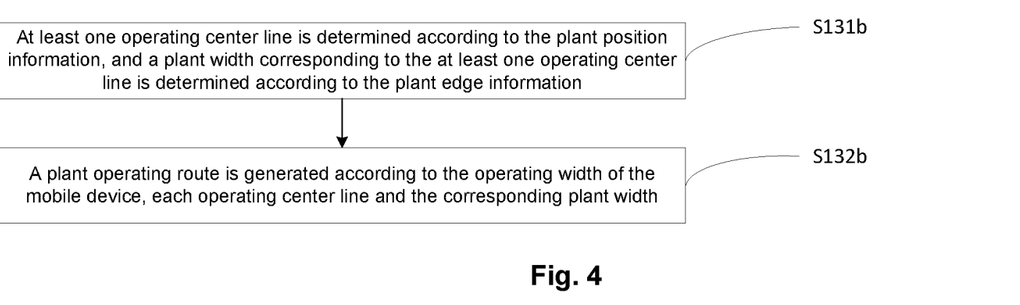
FIG. 4 is a flowchart 2 of planning an operating route of a mobile device in an operating region in an embodiment of the disclosure.

If the topography of the operating region is stepped, especially if the size of a single plant in the operating region is small, it is impractical to limit the operating mode of the single plant. It is possible to plan an operating route of a stepped region step by step. In view of this, in a case that the plant planting data includes plant edge information and plant position information, as shown in FIG. 4, the operation that an operating route of a mobile device in the operating region is planned according to the plant planting data of the operating region includes the following steps:

In step S131b, at least one operating center line is determined according to the plant position information, and a plant width corresponding to the at least one operating center line is determined according to the plant edge information. Specifically, a straight line of a width direction of each plant is perpendicular to the corresponding operating center line.

Specifically, the operating center line here refers to a connecting line formed by the operating center points of all the plants in each stepped region, which may be a curve, a straight line, or a wavy line. Each operating center line corresponds to a plant width. The plant width may be an average width of all the plants corresponding to the operating center line, or the width of a plant with the largest width among all the plants corresponding to the operating center line.

In step S132b, a plant operating route is generated according to the operating width of the mobile device, each operating center line and the corresponding plant width. The plant operating route is used to control the operating route of the mobile device in the operating region. Specifically, in one embodiment of the disclosure, the plant operating route is substantially the sum of the plant operating paths on each stepped region.

It is to be noted that the "operation" in the embodiment of the disclosure may be operations such as spraying insecticides or nutrients, or performing monitoring tasks on the plants in the operating region, which are not listed here. For the final purpose of "operation", the best goal should be to complete the operation of each part of each plant. As for how to achieve the best goal, it can be detected by repeated operations according to the generated plant operating route through the mobile device. Of course, other achievable detection modes are not excluded.

Embodiment 2

The embodiment of the disclosure also provides a method for measuring plant planting data, which may be used for acquiring plant planting data of an operating region by operating route planning, and may, of course, also be used to analyze plant growth conditions. The method for measuring plant planting data includes the following steps.

In step S220, image information of a planting region is received. The image information of the planting region may be provided by an image acquisition device such as a mapping device or a camera. The image information includes, but is not limited to, one or more piece of mapping image information, map information, and picture information.

In step S230, the image information of the planting region is processed using a preset recognition model to obtain plant planting data.

Figure 6:
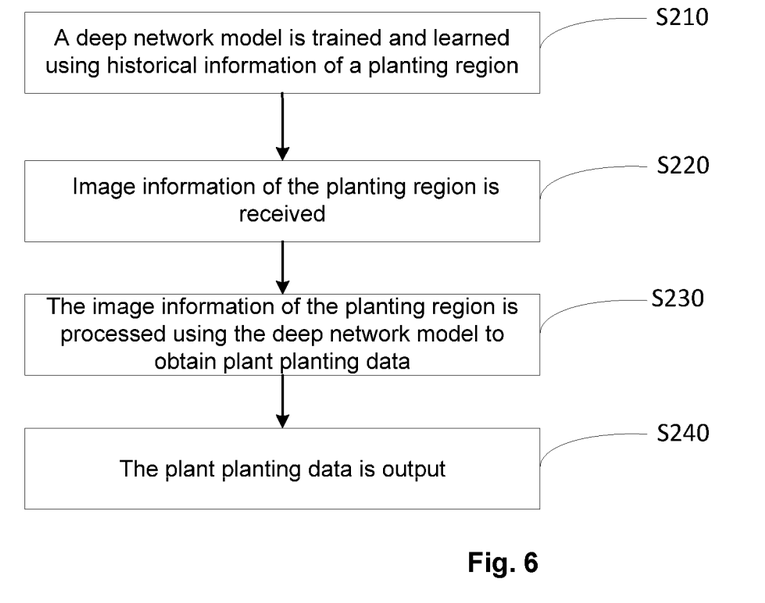
FIG. 6 is a flowchart of a method for measuring plant planting data according to an embodiment of the disclosure.

It can be understood that the method for measuring plant planting data provided in the embodiment of the disclosure may also be output according to actual needs. As shown in FIG. 6, if output is required, step S240 is included. Plant planting data is output according to actual needs for further disclosure.

As can be seen from the above, in the method for measuring plant planting data provided by the embodiment of the disclosure, a preset recognition model is used to process image information of a planting region to obtain plant planting data to simplify the statistical process of plant planting data, thereby improving the statistical efficiency of plant planting data, making route planning more accurate, and avoiding the problems of low statistical efficiency and complicated statistical process caused by manual statistics of plant planting data in the planting region.

It can be understood that in the embodiment of the disclosure, in a case that the image information of the planting region is processed using a preset recognition model, the preset recognition model is a model with an image recognition function, or some algorithms with color recognition, as long as it can recognize plant data from an image.

Figure 7:
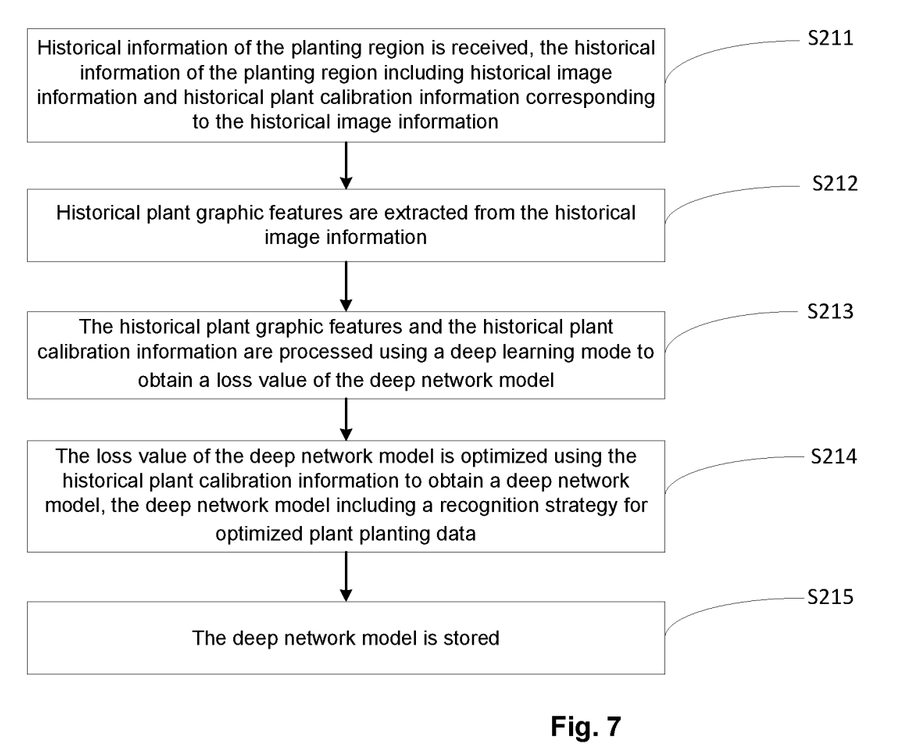
FIG. 7 is a flowchart of training and learning of a deep network model using historical information of a planting region in an embodiment of the disclosure.

In order to make the recognized results more accurate, the preset recognition model in the embodiment of the disclosure is a deep network model, but the deep network model needs training and learning in order to efficiently recognize the image information of the planting region. That is, as shown in FIG. 6, before receiving image information of a planting region, the method for measuring plant planting data provided by the embodiment of the disclosure includes the following steps:

In step S210, a deep network model is trained and learned using historical information of a planting region. As shown in FIG. 7, the step specifically includes the following steps:

In step S211, historical information of the planting region is received. The historical information of the planting region includes historical image information and historical plant calibration information corresponding to the historical image information.

In step S212, historical plant graphic features are extracted from the historical image information, which may be specifically implemented by a Convolutional Neural Network (CNN) model as shown in FIG. 3, and may, of course, also be recognized by other image recognition models.

In step S213, the historical plant graphic features and the historical plant calibration information are processed using a deep learning mode to obtain a loss value of the deep network model.

In step S214, the loss value of the deep network model is optimized using the historical plant calibration information to obtain a deep network model, so that the result of processing the image information of the planting region using the deep network model is more accurate. The deep network model includes a recognition strategy for optimized plant planting data.

Specifically, the optimization method may be implemented using a reverse transfer optimization method, and of course, other optimization methods may be selected.

In order to facilitate the subsequent disclosure of the deep network model for image recognition, as shown in FIG. 7, the method for measuring plant planting data provided in the embodiment of the disclosure further includes step S215, in which the deep network model is stored. The deep network model may be stored in a storage component 130 (shown in FIG. 10) or memory with a storage function.

Figure 8:
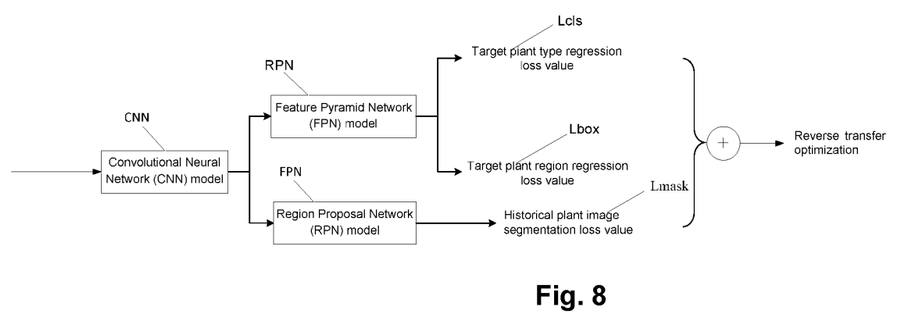
FIG. 8 is a structural schematic diagram of a deep network model in an embodiment of the disclosure.

Exemplarily, the historical plant calibration information provided in the embodiment of the disclosure includes historical plant edge calibration information and/or historical plant type calibration information. As shown in FIG. 8, the operation that the historical plant graphic features and the historical plant calibration information are processed using a deep learning mode to obtain a loss value of the deep network model at this time includes the following step.

A Feature Pyramid Network (FPN) model is used to perform image segmentation on the historical plant graphics features to obtain a plant historical image segmentation result. The plant historical image segmentation result is substantially a series of plant edge track point prediction information. A plant edge formed by the plant edge track point prediction information is an irregular edge.

The FPN model is based on a feature extraction network, which may be a common network such as ResNet or DenseNet, and may be used in target detection, instance segmentation, gesture recognition, facial recognition, and other disclosures. A pre-training model is taken under a commonly used deep learning framework and may be used to implement FPN.

Target sizes in an image are various. Objects in a data set cannot cover all scales, so it is necessary to use an image pyramid (downsampling with different resolutions) to assist a CNN in learning. But this speed is too slow, so only a single scale can be used for prediction, and some people will take the intermediate result to predict. This kind of architecture is widely used in a case that there is auxiliary information and auxiliary loss function.

FPN improves the above method in a very clever way. In addition to the lateral connection, it also adds a top-down connection. The results from the top to the bottom and the results obtained from the side are fused together by adding to obtain feature maps of different resolutions, and they all contain semantic information of an original deepest feature map.

In order to verify an error between the plant historical image segmentation result and actual plant edge calibration information, the method further includes: obtaining a historical plant image segmentation loss value Lmask according to the plant historical image segmentation result and the historical plant edge calibration information.

And/or, a Region Proposal Network (RPN) model is used to process the historical plant graphic features to obtain a target plant region result. The target plant region result is substantially a series of plant edge track point prediction information, but the difference from the plant historical image segmentation result is that a plant edge formed by the plant edge track point prediction information is a regular circle, so as to further use the plant edge track point prediction information to obtain plant position prediction information.

The RPN model is a fully convolutional network that may perform end-to-end training for specific tasks to generate proposals. The input of RPN is an image. The output is divided into two branches, one is the probability of target and non-target, and the other is four parameters of bbox, which are center coordinates x, y of bbox, and a width w and a length h of bbox. In order to obtain an output region proposal, a small network is used to slide on the last convolutional layer feature map of five convolutional layers. Each sliding window is mapped to a lower-dimensional feature. Finally, two fully connected layers in parallel are formed, namely a box regression layer and a box classification layer.

In order to verify an error between the plant position prediction information obtained from the target plant region result and the actual plant edge calibration information, the method further includes: obtaining a target plant region regression loss value Lbox according to the target plant region result and the historical plant edge calibration information.

And/or, the historical plant graphic features are processed using the RPN model to obtain target plant type information, and a target plant type regression loss value Lcls is obtained according to the target plant type information and the historical plant type calibration information.

A loss value of the deep network model is obtained according to one or more of the historical plant image segmentation loss value Lmask, the target plant region regression loss value Lbox and the target plant type regression loss value Lcls.

The historical plant image segmentation loss value Lmask, the target plant region regression loss value Lbox and the target plant type regression loss value Lcls are substantially a scalar. The process of obtaining a loss value of the deep network model according to one or more of the historical plant image segmentation loss value Lmask, the target plant region regression loss value Lbox and the target plant type regression loss value Lcls is equivalent to adding one or more of the historical plant image segmentation loss value Lmask, the target plant region regression loss value Lbox and the target plant species regression loss value Lcls. At this time, the loss value of the deep network model is optimized using the historical plant calibration information, so that the recognition strategy for plant planting data can be more accurate.

Figure 9:
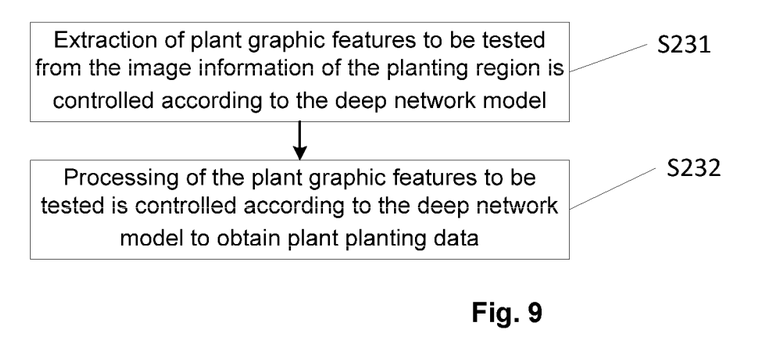
FIG. 9 is a flowchart of processing image information of a planting region using a deep network model in an embodiment of the disclosure.

Optionally, as shown in FIG. 9, the operation that the image information of the planting region is processed using a deep network model to obtain plant planting data includes the following steps:

In step S231, extraction of plant graphic features to be tested from the image information of the planting region is controlled according to the deep network model.

In step S232, processing of the plant graphic features to be tested is controlled according to the deep network model to obtain plant planting data.

The operation that processing of the plant graphic features to be tested is controlled according to the deep network model to obtain plant planting data includes the following steps:

The FPN model is controlled to perform image segmentation on the plant graphic features to be tested according to the deep network model to obtain plant edge information.

The plant edge information includes plant crown shape, plant size, and the like.

And/or, the FPN model is controlled to process the plant graphic features to be tested to obtain plant growth information according to the deep network model. A plant growth condition is determined according to the plant edge information.

The plant growth information is used to characterize the growth condition of a plant, including whether the plant is germinating, the germination rate of the plant, the flowering condition of the plant, the pollination condition of the plant, the condition of the plant suffering from pests and weeds, and the maturity of the plant, etc. In one embodiment, plant diseases and insect pests are automatically recognized by a deep recognition model. By calibrating damaged pictures such as pests and weeds in the historical image information of the planting region, the plant diseases and insect pests may be automatically recognized through the deep recognition model, thereby monitoring plant health conditions, and generating plant growth information.

And/or, the RPN model is controlled to process the plant graphic features to be tested to obtain plant position information according to the deep network model.

According to the deep network model, combined with the image information of the planting region, information such as the degree of sparseness of the plant, the position of the plant, and the distribution of the plant may be obtained. For example, the image information of the planting region comes from geographic coordinates 23.06.32 degrees north latitude and 113.15.53 degrees east longitude. The geographic location of the plant is determined according to an image sampling geographic location and a relative position of the plant in the image.

And/or, the RPN model is controlled to process the plant graphic features to be tested to obtain plant quantity information according to the deep network model. Of course, the plant quantity information may also be obtained by the plant position information.

And/or, the RPN model is controlled to process the historical plant graphic features to obtain plant type information according to the deep network model.

It should be noted that the data output by the deep network model is input to the RPN model, so that the RPN model can process or analyze the above data output by the deep network model.

If plant planting data needs to be output, the deep network model is used to process the image information of the planting region, and after obtaining the plant planting data, the method for measuring plant planting data provided by the embodiment of the disclosure further includes the following steps.

One or more piece of the plant edge information, the plant position information, the plant growth information, the plant quantity information and the plant type information are output as plant planting data. Exemplarily, Table 1 lists output plant edge information and plant position information.

TABLE 1

Plant planting data measured by a method for measuring plant planting data provided in an embodiment of the disclosure

| Number | Plant center point position/pix | Plant radius/pix |
|---|---|---|
| 1 | (317, 101) | 58.69 |
| 2 | (472, 379) | 65.0 |
| 3 | (486, 189) | 48.373 |
| 4 | (326, 34) | 52.49 |
| 5 | (364, 256) | 53.03 |
| 6 | (214, 318) | 56.58 |
| 7 | (20, 116) | 37.73 |
| 8 | (388, 130) | 57.3 |
| 9 | (185, 397) | 86.97 |
| 10 | (139, 238) | 72.83 |
| 11 | (433, 56) | 67.89 |
| 12 | (109, 482) | 60.03 |
| 13 | (381, 402) | 69.31 |
| 14 | (106, 353) | 68.59 |
| 15 | (296, 421) | 78.51 |
| 16 | (299, 355) | 57.28 |
| 17 | (32, 20) | 35.22 |

From the plant planting data listed in Table 1, it can be found that the plant planting data listed in the method for measuring plant planting data provided in the embodiment of the disclosure includes a plant center point position and a plant radius. The plant radius is a form of expression of plant edge information and plant growth information. The plant center point position is a form of expression of plant quantity information and plant position information.

Embodiment 3

Figure 5:
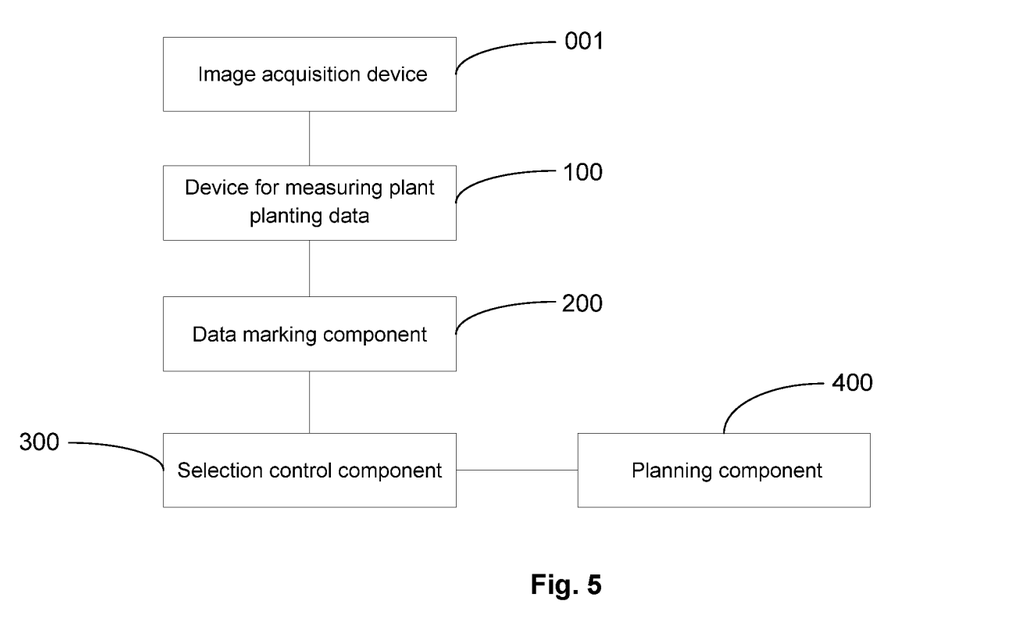
FIG. 5 is a schematic structure diagram of an operating route planning system provided by an embodiment of the disclosure.

The embodiment of the disclosure also provides an operating route planning system. As shown in FIG. 5, the operating route planning system includes: a device for measuring plant planting data 100 (which is connected with image acquisition device 001) and a planning component 400.

The device for measuring plant planting data 100 is configured to acquire, according to a method for measuring plant planting data provided according to Embodiment 2, plant planting data of an operating region from an operating region image for operating route planning.

The planning component 400 is configured to plan an operating route of a mobile device in the operating region according to the plant planting data of the operating region.

Compared with the conventional art, the beneficial effects of the operating route planning system provided by the embodiment of the disclosure are the same as those of the method for planning operating route provided in Embodiment 1, and will not be described herein.

The operating route includes, but is not limited to, one or more of an arc-shaped route, a spiral route, a concentric circle route, a broken-line route, and an in-situ rotation route.

Optionally, as shown in FIG. 5, the operating route planning system provided by the embodiment of the disclosure further includes: a data marking component 200 and a selection control component 300.

The data marking component 200 is configured to visually mark, before planning an operating route of a mobile device in the operating region after acquiring the plant planting data of the operating region, the plant planting data of the operating region.

The selection control component 300 is configured to acquire plant planting data of a plant region to be operated from the visually marked plant planting data of the operating region according to a selection instruction sent by a user.

The planning component 400 is specifically configured to plan an operating route of the mobile device in the plant region to be operated according to the plant planting data of the plant region to be operated.

As a achievable mode, in a case that the terrain is relatively flat and the plant is large, if the plant planting data includes plant edge information and plant position information, the planning component 400 in the embodiment of the disclosure is specifically configured to: determine an operating center point of each plant according to the plant position information of the operating region; determine an operating radius of each plant according to the plant edge information of the operating region; and generate a plant operating route according to the operating center point of each plant, the operating radius of each plant and an operating width of the mobile device, the plant operating route being used to control the operating route of the mobile device in the operating region.

As another achievable mode, in a case that the terrain is steep and stepped and the plant is small, if the plant planting data includes plant edge information and plant position information, the planning component 400 in the embodiment of the disclosure is specifically configured to: determine at least one operating center line according to the plant position information; determine a plant width corresponding to at least one operating center line according to the plant edge information, a straight line of a width direction of each plant being perpendicular to the corresponding operating center line; and generate a plant operating route according to the operating width of the mobile device, each operating center line and the corresponding plant width, the plant operating route being used to control the operating route of the mobile device in the operating region.

Embodiment 4

Figure 10:
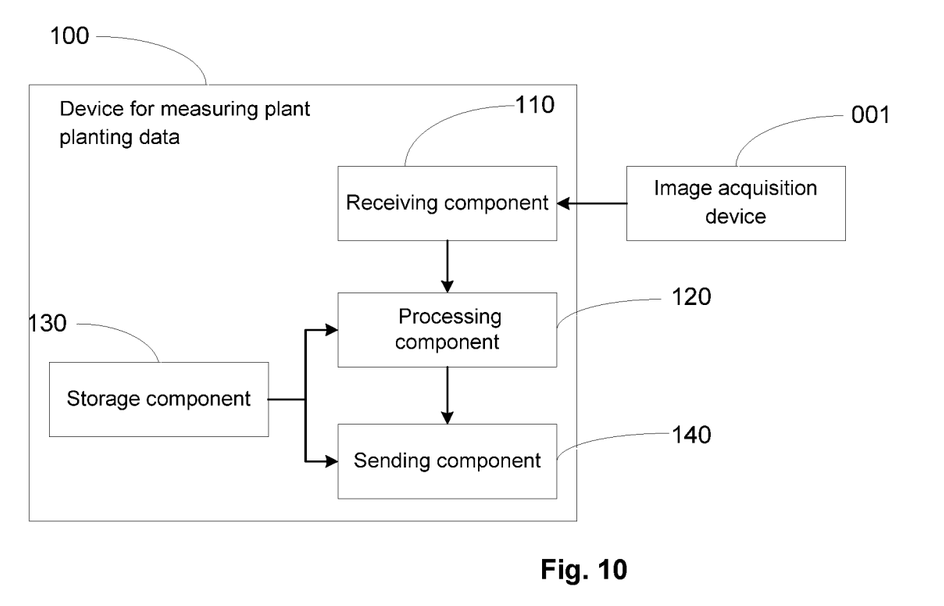
FIG. 10 is a structural block diagram of a device for measuring plant planting data according to an embodiment of the disclosure.

The embodiment of the disclosure provides a device for measuring plant planting data 100, which may serve as the device for measuring plant planting data 100 included in the operating route planning system provided in Embodiment 3. As shown in FIG. 10, the device for measuring plant planting data 100 includes: a receiving component 110 and a processing component 120.

The receiving component 110 is configured to receive image information of a planting region.

The processing component 120 is configured to process the image information of the planting region using a preset recognition model to obtain plant planting data.

Compared with the conventional art, the beneficial effects of the device for measuring plant planting data provided by the embodiment of the disclosure are the same as those of the method for measuring plant planting data provided in Embodiment 2, and will not be described herein.

The image information includes one or more piece of mapping image information, map information, and picture information. Of course, it may also be other forms of image information, such as infrared images, which are not listed here.

Specifically, as shown in FIG. 10, in a case that the preset recognition model is a deep network model, the device for measuring plant planting data 100 provided in the embodiment of the disclosure further includes a storage component 130, configured to store the deep network model.

The receiving component 110 is further configured to receive, before receiving image information of a planting region, historical information of the planting region, historical information of a type region including historical image information and historical plant calibration information corresponding to the historical image information.

Figure 11:
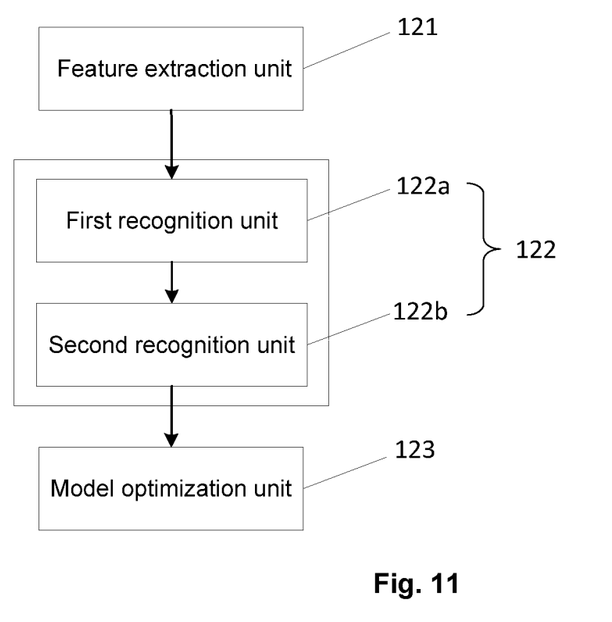
FIG. 11 is a structural block diagram of a deep network model according to an embodiment of the disclosure.

As shown in FIG. 11, the processing component 120 includes a feature extraction unit 121, configured to extract, before receiving image information of a planting region, historical plant graphic features from the historical image information, and control to extract plant graphic features to be tested from the image information of the planting region according to the deep network model after receiving the image information of the planting region. Specifically, a feature extraction unit 122 is substantially configured to extract historical plant graphic features from historical image information, and to specifically extract historical plant graphic features using a model having an image recognition function such as a CNN model.

The information recognition unit 122 is configured to process, before receiving image information of a planting region, the historical plant graphic features and the historical plant calibration information using a deep learning mode to obtain a loss value of the deep network model, and control to process the plant graphic features to be tested according to the deep network model to obtain plant planting data after receiving the image information of the planting region.

A model optimization unit 123 is configured to optimize, before receiving image information of a planting region, the loss value of the deep network model using the historical plant calibration information (the optimization method may be a reverse transfer optimization method) to obtain a deep network model, the deep network model including a recognition strategy for optimized plant planting data.

Optionally, the historical plant calibration information in the embodiment of the disclosure includes historical plant edge calibration information and/or historical plant type calibration information.

As shown in FIG. 11, the information recognition unit 122 includes a first recognition unit 122a, configured to: perform, before receiving image information of a planting region, image segmentation on the historical plant graphic features using an FPN model to obtain a plant historical image segmentation result, and obtain a historical plant image segmentation loss value Lmask according to the plant historical image segmentation result and the historical plant edge calibration information; and perform, according to the deep network model, image segmentation on the plant graphic features to be tested using the FPN model to obtain plant edge information after receiving the image information of the planting region, and/or control, according to the deep network model, the feature pyramid model to process the plant graphic features to be tested to obtain plant growth information.

A second recognition unit 122b is configured to: process, before receiving image information of a planting region, the historical plant graphic features using an RPN model to obtain a target plant region result, and obtain a target plant region regression loss value Lbox according to the target plant region result and the historical plant edge calibration information; and perform, according to the deep network model, the plant graphic features to be tested using the RPN model to obtain plant position information after receiving the image information of the planting region, and/or control, according to the deep network model, the RPN model to process the plant graphic features to be tested to obtain plant quantity information; and/or, process, before receiving image information of a planting region, the historical plant graphic features using the RPN model to obtain target plant type information, obtain a target plant type regression loss value Lcls according to the target plant type information and the historical plant type calibration information, and process, according to the deep network model, the historical plant graphic features using the RPN model to obtain plant type information after receiving the image information of the planting region.

An information calculation unit is configured to obtain, before receiving image information of a planting region, a loss value of the deep network model according to one or more of the historical plant image segmentation loss value Lmask, the target plant region regression loss value Lbox and the target plant type regression loss value Lcls.

If plant planting data needs to be output, as shown in FIG. 10, the device for measuring plant planting data 100 according to the embodiment of the disclosure further includes a sending component 140, configured to output one or more piece of the plant edge information, the plant position information, the plant quantity information, the plant growth information and the plant type information as plant planting data.

Embodiment 5

Figure 12:
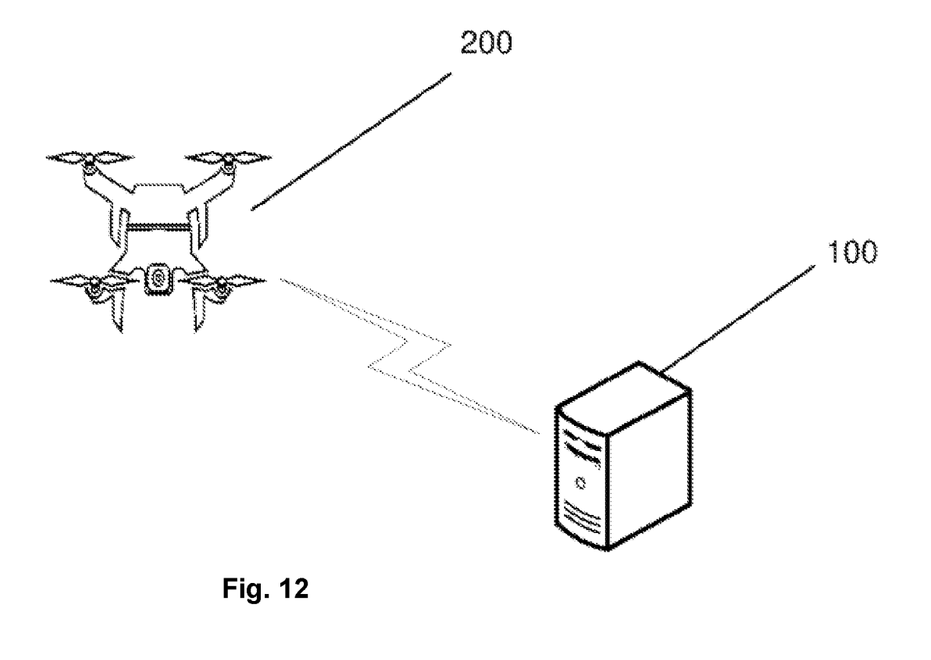
FIG. 12 is a schematic diagram of information interaction of a plant planting data measuring system according to an embodiment of the disclosure.

The embodiment of the disclosure also provides a plant planting data measuring system. As shown in FIG. 10 and FIG. 12, the plant planting data measuring system includes an image acquisition device 001 and a memory 302 provided in the above embodiment. An output end of the image acquisition device 001 is connected to a receiving component included in a device for measuring plant planting data 100.

The image acquisition device 001 may acquire historical image information included in historical information of a planting region or image information of a current planting region, and transmit the information to the device for measuring plant planting data 100, so that the device for measuring plant planting data 100 can optimize a deep network model according to the historical image information included in historical information of a mapping planting region in combination with historical plant calibration information included in historical information of the planting region. Therefore, in a case that the image information of the current planting region is received, plant planting data can be quickly measured by calling a deep network model.

Compared with the conventional art, the beneficial effects of the device for measuring plant planting data 100 provided by the embodiment of the disclosure are the same as those of the method for measuring plant planting data provided by the above technical solution, and will not be described herein.

Specifically, as shown in FIG. 12, in the plant planting data measuring system provided by the embodiment of the disclosure, the image acquisition device 001 is generally a mapping aircraft. Of course, it may also be other shooting devices such as a camera.

As shown in FIG. 6 and FIG. 9, the planting region is photographed at high altitude, and the device for measuring plant planting data 100 may be arranged on the ground in the form of a server, and image information of a planting region collected by the mapping aircraft is transmitted to the server by wireless transmission.

Of course, the device for measuring plant planting data 100 may also be arranged in the mapping aircraft, so that the device for measuring plant planting data 100 can process the image information of the planting region collected by the mapping aircraft in real time. In a case that the device for measuring plant planting data 100 is arranged on the mapping aircraft, the mapping aircraft includes a mapping component and a flight control component. The device for measuring plant planting data 100 provided in the embodiment of the disclosure is arranged in the flight control component, and the mapping component is connected to the receiving component 110.

Optionally, the image acquisition device in the embodiment of the disclosure includes at least a positioning unit and an image acquisition unit. The positioning unit may be configured to position plant position information. The image acquisition unit is configured to acquire image information. The positioning unit and the image acquisition unit are respectively connected to the receiving component. The receiving component is connected to the sending component. In this way, in a case that the image acquisition device acquires the image information of the planting region, each time image information of a plant is acquired, the plant may be positioned, so that the position of the plant may be obtained during the image acquisition stage, and it is only necessary to analyze an edge contour for the acquired image information later. In other embodiments, the position of the mapping aircraft may be used as a reference for determining the position of the plant, so that the position of the plant may be indirectly determined by the position information of the mapping aircraft. Of course, in order to more accurately determine the center position of the plant, it is necessary to analyze the center point position of the plant.

The above is only the specific implementation manner of the disclosure, but the scope of protection of the disclosure is not limited thereto. Any person skilled in the art can easily think of changes or replacements within the technical scope disclosed by the disclosure, which should be covered by the scope of protection of the disclosure. Therefore, the scope of protection of the disclosure should be determined by the scope of protection of the claims.

INDUSTRIAL APPLICABILITY

The solution provided by the embodiments of the disclosure may be applied to the technical field of plant protection. In the embodiments of the disclosure, a preset recognition model is used to process image information of a planting region transmitted by a mapping device to obtain plant planting data to simplify the statistical process of plant planting data, thereby improving the statistical efficiency of plant planting data, and avoiding the problems of low statistical efficiency and complicated statistical process caused by manual statistics of plant planting data in the planting region.

What is claimed is:

1. A method for measuring plant planting data, comprising:
   receiving image information of a planting region; and
   processing the image information of the planting region using a preset recognition model to obtain plant planting data, wherein the preset recognition model is a deep network model, and before receiving image information of a planting region, the method for measuring plant planting data further comprises:
   receiving historical information of the planting region, the historical information of the planting region comprising historical image information and historical plant calibration information corresponding to the historical image information;
   extracting historical plant graphic features from the historical image information;
   processing the historical plant graphic features and the historical plant calibration information using a deep learning mode to obtain a loss value of the deep network model;
   optimizing the loss value of the deep network model using the historical plant calibration information to obtain a deep network model, the deep network model comprising a recognition strategy for optimized plant planting data; and
   storing the deep network model.

2. The method for measuring plant planting data as claimed in claim 1, wherein the image information comprises one or more piece of: mapping image information, map information, and picture information.

3. The method for measuring plant planting data as claimed in claim 1, wherein processing the historical plant graphic features and the historical plant calibration information using a deep learning mode to obtain a loss value of the deep network model comprises:
   in a case that the historical plant calibration information comprises historical plant edge calibration information, performing image segmentation on the historical plant graphic features using a Feature Pyramid Network (FPN) model to obtain a plant historical image segmentation result, and obtaining a historical plant image segmentation loss value according to the plant historical image segmentation result and the historical plant edge calibration information;

in a case that the historical plant calibration information comprises historical plant edge calibration information, processing the historical plant graphic features using a Region Proposal Network (RPN) model to obtain a target plant region result, and obtaining a target plant region regression loss value according to the target plant region result and the historical plant edge calibration information;

in a case that the historical plant calibration information comprises historical plant type calibration information, processing the historical plant graphic features using the RPN model to obtain target plant type information, and obtaining a target plant type regression loss value according to the target plant type information and the historical plant type calibration information; and obtaining a loss value of the deep network model according to one or more of the historical plant image segmentation loss value, the target plant region regression loss value and the target plant type regression loss value.

4. The plant planting data measuring method according to claim 1, wherein processing the image information of the planting region using the preset recognition model to obtain plant planting data comprises:

controlling to extract plant graphic features to be tested from the image information of the planting region according to the preset recognition model; and controlling to process the plant graphic features to be tested according to the preset recognition model to obtain plant planting data.

5. The plant planting data measuring method according to claim 1, wherein controlling to process the plant graphic features to be tested according to the preset recognition model to obtain plant planting data comprises at least one of the following:

controlling, according to the deep network model, a Feature Pyramid Network (FPN) model to perform image segmentation on the plant graphic features to be tested to obtain plant edge information;

controlling, according to the deep network model, a Region Proposal Network (RPN) model to process the plant graphic features to be tested to obtain plant position information;

controlling, according to the deep network model, the RPN model to process the plant graphic features to be tested to obtain plant quantity information;

controlling, according to the deep network model, the FPN model to process the plant graphic features to be tested to obtain plant growth information; and controlling, according to the deep network model, the RPN model to process the historical plant graphic features to obtain plant type information.

6. The method for measuring plant planting data as claimed in claim 1, wherein, the method further comprises planning an operating route of a mobile device in the operating region according to the plant planting data of the operating region.

7. The method for measuring plant planting data as claimed in claim 6, wherein in a case that the plant planting data comprises plant edge information and plant position information, planning an operating route of a mobile device in the operating region according to the plant planting data of the operating region comprises:

determining an operating center point of each plant according to the plant position information of the operating region;

determining an operating radius of each plant according to the plant edge information of the operating region; and generating a plant operating route according to the operating center point of each plant, the operating radius of each plant and an operating width of the mobile device, the plant operating route being used to control the operating route of the mobile device in the operating region.

8. The method for measuring plant planting data as claimed in claim 6, wherein in a case that the plant planting data comprises plant edge information and plant position information, planning an operating route of a mobile device in the operating region according to the plant planting data of the operating region comprises:

determining at least one operating center line according to the plant position information;

determining a plant width corresponding to at least one operating center line according to the plant edge information; and generating a plant operating route according to the operating width of the mobile device, each operating center line and the corresponding plant width, the plant operating route being used to control the operating route of the mobile device in the operating region.

9. The method for measuring plant planting data as claimed in claim 6, wherein the operating route comprises one or more of an arc-shaped route, a spiral route, a concentric circle route, a broken-line route, and an in-situ rotation route.

10. The method for measuring plant planting data as claimed in claim 6, wherein before planning an operating route of a mobile device in the operating region, the method further comprises:

visually marking the plant planting data of the operating region; acquiring plant planting data of a plant region to be operated from the visually marked plant planting data of the operating region according to a selection instruction of a user; and planning an operating route of a mobile device in the operating region according to the plant planting data of the operating region comprises: planning an operating route of the mobile device in the plant region to be operated according to the plant planting data of the plant region to be operated.

11. A device for measuring plant planting data, comprising:

a receiving component, configured to receive image information of a planting region;

a processing component, configured to process the image information of the planting region using a preset recognition model to obtain plant planting data, wherein the preset recognition model is a deep network model, the device for measuring plant planting data further comprising a storage component configured to store the deep network model, the receiving component is further configured to receive, before receiving image information of a planting region, historical information of the planting region, the historical information of the planting region comprising historical image information and historical plant calibration information corresponding to the historical image information; and the processing component comprises:

a feature extraction unit, configured to extract, before receiving image information of a planting region, historical plant graphic features from the historical image information, and control to extract plant graphic features to be tested from the image information of the planting region according to the deep network model after receiving the image information of the planting region;

an information recognition unit, configured to process, before receiving image information of a planting region, the historical plant graphic features and the historical plant calibration information using a deep learning mode to obtain a loss value of the deep network model, and control to process the plant graphic features to be tested according to the deep network model to obtain plant planting data after receiving the image information of the planting region; and a model optimization unit, configured to optimize, before receiving image information of a planting region, the loss value of the deep network model using the historical plant calibration information to obtain a deep network model, the deep network model comprising a recognition strategy for optimized plant planting data.

12. The device for measuring plant planting data as claimed in claim 11, wherein the image information comprises one or more piece of mapping image information, map information, and picture information.

13. The device for measuring plant planting data as claimed in claim 11, wherein the information recognition unit comprises:

a first recognition unit, configured to: perform, before receiving image information of a planting region, image segmentation on the historical plant graphic features using a Feature Pyramid Network (FPN) model to obtain a plant historical image segmentation result in a case that the historical plant calibration information comprises historical plant edge calibration information, and obtain a historical plant image segmentation loss value according to the plant historical image segmentation result and the historical plant edge calibration information; and perform, according to the deep network model, image segmentation on the plant graphic features to be tested using the FPN model to obtain plant edge information after receiving the image information of the planting region, and control, according to the deep network model, the FPN model to process the plant graphic features to be tested to obtain plant growth information;

a second recognition unit, configured to: process, before receiving image information of a planting region, the historical plant graphic features using a Region Proposal Network (RPN) model to obtain a target plant region result in a case that the historical plant calibration information comprises historical plant edge calibration information, and obtain a target plant region regression loss value according to the target plant region result and the historical plant edge calibration information; and perform, according to the deep network model, the plant graphic features to be tested using the RPN model to obtain plant position information after receiving the image information of the planting region, and control, according to the deep network model, the RPN model to process the plant graphic features to be tested to obtain plant quantity information; and process, before receiving image information of a planting region, the historical plant graphic features using the RPN model to obtain target plant type information in a case that the historical plant calibration information comprises historical plant type calibration information, obtain a target plant type regression loss value according to the target plant type information and the historical plant type calibration information, and process, according to the deep network model, the historical plant graphic features using the RPN model to obtain plant type information after receiving the image information of the planting region transmitted by a mapping device;

an information calculation unit, configured to obtain, before receiving image information of a planting region, a loss value of the deep network model according to one or more of the historical plant image segmentation loss value, the target plant region regression loss value and the target plant type regression loss value; and the device for measuring plant planting data further comprises a sending component, configured to output one or more piece of the plant edge information, the plant position information, the plant type information, the plant quantity information and the plant growth information as plant planting data.

14. A plant planting data measuring system, comprising an image acquisition device and a device for measuring plant planting data as claimed in claim 11, an output end of the image acquisition device being connected to a receiving component of the device for measuring plant planting data.

15. The plant planting data measuring system as claimed in claim 14, wherein if the image acquisition device is a mapping aircraft, the mapping aircraft comprises a mapping component and a flight control component, the device for measuring plant planting data is arranged in the flight control component, and the mapping component is connected to the receiving component.

16. The plant planting data measuring system as claimed in claim 14, wherein the image acquisition device comprises at least a positioning unit and an image acquisition unit, the positioning unit is configured to position plant position information, the image acquisition unit is configured to acquire image information, and the positioning unit and the image acquisition unit are connected to the receiving component respectively.

17. The device for measuring plant planting data as claimed in claim 11, wherein the device is applied in an operating route planning system; the operating route planning system comprising:

the device for measuring plant planting data; and a planning component, configured to plan an operating route of a mobile device in the operating region according to the plant planting data of the operating region.

18. The device for measuring plant planting data as claimed in claim 17, wherein in a case that the plant planting data comprises plant edge information and plant position information, the planning component is specifically configured to: determine an operating center point of each plant according to the plant position information of the operating region; determine an operating radius of each plant according to the plant edge information of the operating region; and generate a plant operating route according to the operating center point of each plant, the operating radius of each plant and an operating width of the mobile device, the plant operating route being used to control the operating route of the mobile device in the operating region.

* * * * *